(12) United States Patent
Miyazaki et al.

(10) Patent No.: US 8,007,604 B2
(45) Date of Patent: Aug. 30, 2011

(54) TITANIUM-TANTALUM BASE SHAPE MEMORY ALLOYS, ACTUATOR AND ENGINE

(75) Inventors: Shuichi Miyazaki, Ibaraki (JP);
Heeyoung Kim, Ibaraki (JP);
Buenconsejo Pio, Ibaraki (JP); Hideki Hosoda, Kanagawa (JP)

(73) Assignee: University of Tsukuba, Tsukuba-Shi, Ibaraki (JP)

( * ) Notice: Subject to any disclaimer, the term of this patent is extended or adjusted under 35 U.S.C. 154(b) by 357 days.

(21) Appl. No.: 12/212,590

(22) Filed: Sep. 17, 2008

(65) Prior Publication Data

US 2009/0220811 A1    Sep. 3, 2009

Related U.S. Application Data

(63) Continuation of application No. PCT/JP2006/323976, filed on Nov. 30, 2006.

(30) Foreign Application Priority Data

Mar. 17, 2006  (JP) .................................. 2006-075102

(51) Int. Cl.
*C22C 27/02* (2006.01)
(52) U.S. Cl. ......................... 148/402; 148/422; 420/427
(58) Field of Classification Search .................. 148/403
See application file for complete search history.

(56) References Cited

U.S. PATENT DOCUMENTS

| 4,770,725 A | 9/1988 | Simpson et al. |
| 5,273,116 A | 12/1993 | Ross |
| 6,786,984 B1 * | 9/2004 | Hanada et al. ................ 148/421 |
| 2007/0106267 A1 | 5/2007 | Hood et al. |

FOREIGN PATENT DOCUMENTS

| JP | 59-28548 | 2/1984 |
| JP | 60-26648 | 2/1985 |
| JP | 62-37353 | 2/1987 |
| JP | 63-13898 | 1/1988 |
| JP | 63-96234 | 4/1988 |
| JP | 11-36024 | 5/1989 |
| JP | 03-219037 | 9/1991 |
| JP | 02-539786 | 10/1996 |

(Continued)

OTHER PUBLICATIONS

Ikeda et al., "Effects of Sn and Zr Additions on Phase Constitution and Aging Behavior Ti-50 mass% Ta Alloys Quenched from β Singe Phase Region", Materials Transactions, The Japan Institute of Metals, vol. 45, Issue 4, pp. 1106-1112, 2004.

(Continued)

*Primary Examiner* — George Wyszomierski
(74) *Attorney, Agent, or Firm* — Knobbe Martens Olson & Bear, LLP

(57) ABSTRACT

A Titanium-Tantalum base shape memory alloy is provided which possesses high machinability and is suitable for repeated high temperature operation. The Titanium-Tantalum base shape memory alloy consists of 15 mol %-40 mol % Tantalum, additive elements, and the balance Titanium and impurities.

16 Claims, 4 Drawing Sheets

FOREIGN PATENT DOCUMENTS

| | | |
|---|---|---|
| JP | 10-08168 | 1/1998 |
| JP | 2001-329325 | 11/2001 |
| JP | 2002-294371 | 10/2002 |
| JP | 2005-256689 | 9/2005 |
| JP | 2005-336534 | 12/2005 |
| WO | WO 2007/108178 | 9/2007 |
| WO | WO 2007/108180 | 9/2007 |

OTHER PUBLICATIONS

International Search Report and Written Opinion, for application # PCT/JP2006/3234206 dated Jan. 16, 2007.

Kanchibhotla et al., "Amorphization in Ni-Ti-Ta system through mechanical alloying.", Journal of Materials Science, 2005, vol. 40, Issue 18.

\* cited by examiner

TITANIUM-TANTALUM BASE SHAPE MEMORY ALLOYS, ACTUATOR AND ENGINE

RELATED APPLICATIONS

This application is a Continuation of PCT Application No. PCT/JP2006/323976, filed Nov. 30, 2006, which claims priority to Japanese Application No. 2006-075102, filed Mar. 17, 2006, the entire contents of both of which are hereby incorporated by reference.

BACKGROUND

1. Field of the Inventions

The present inventions relate to Titanium-Tantalum base shape memory alloys, as well as actuators and engines using the said shape memory alloys, for example, Titanium-Tantalum base shape memory alloys with a reverse transformation temperature of over 50° C., as well as actuators and engines using such shape memory alloys.

2. Description of the Related Art

Ti—Ni base alloys are widely known shape memory alloys consisting of Titanium (Ti) and Nickel (Ni) which revert back to their original configuration upon application of heat up to their prescribed operating temperature, remembering their original shape.

However, in commercial Ti—Ni alloys, the peak transformation temperature (M*) is below 70° C. (343K), and the peak reverse transformation temperature (A*) is below 100° C. (373K). Thus, the operating temperature of the shape memory effect is less than approximately 100° C. Accordingly, conventional Ti—Ni base alloys are not suitable for operation as shape memory alloys at high temperature. For example, Ti—Ni—Cu base alloys are generally known to exhibit shape memory effect at temperatures in the range of 200K to 360K The below mentioned alloys are generally well known high temperature shape memory alloys for use at high temperature (over 50° C. in the present application) with transformation start temperatures exceeding 110° C.

(1) (Ti—Zr)—Ni Alloys

In (Ti—Zr)—Ni base alloy, Titanium is substituted by 0-20 mol % (atomic percent) Zirconium, thus a corresponding martensite start temperature ($M_s$) from 373(K) to 550(K) is obtained.

(2) (Ti—Hf)—Ni Alloys

In (Ti—Hf)—Ni base alloy, Titanium is substituted by 0-20 mol % Hafnium (Hf), thus a corresponding martensite start temperature ($M_s$) in the range of 373(K) to 560(K) is obtained.

(3) Ti—(Ni—Pd) Alloys

In Ti—(Ni—Pd) base alloy, Nickel is substituted by 0-50 mol % Palladium (Pd), thus a corresponding martensite start temperature ($M_s$) in the range of 280(K) to 800(K) is obtained.

(4) Ti—(Ni—Au) Alloys

In Ti—(Ni—Pd) base alloy, Nickel is substituted by 0-50 mol % Gold (Au), thus a corresponding martensite start temperature ($M_s$) in the range of 300(K) to 850(K) is obtained.

(5) Ti—(Ni—Pt) Alloys

In Ti—(Ni—Pt) base alloy, Nickel is substituted by 0-50 mol % Platinum (Pt), thus a corresponding martensite start temperature ($M_s$) in the range of 280(K) to 1300(K) is obtained.

(6) Ti—Al Alloys

In Ti—Al base alloys, comprising 30-36 mol % Aluminum with the balance Nickel, a corresponding martensite start temperature ($M_s$) in the range of 273(K) to 1000(K) is obtained.

(7) Ti—Nb Alloys

In Ti—Nb alloys comprising 10-28 mol % Niobium with the balance Titanium, a corresponding martensite start temperature ($M_s$) in the range of 173(K) to 900(K) is obtained.

(8) Ti—Pd Alloys

As described in Kokai publication Tokukai No. Hei 11-36024, alloys comprising 48-50 mol % Palladium and 50-52 mol % Titanium by atomic percentage possesses a reverse transformation finish temperature ($A_f$) in excess of 560° C. (833K).

(9) Ti—Ta Alloys

As described in Ikeda, et al. (Masahiko Ikeda, Shin-ya Komatsu and Yuichiro Nakamura, Effects of Sn and Zr Additions on Phase Constitution and Aging Behavior Ti-50 mass % Ta Alloys Quenched from β Singe Phase Region, Materials Transactions, The Japan Institute of Metals, page 1106-1112, issue 4, volume 45, 2004) alloys comprising 50% Tantalum by mass percentage (less than 30% converted to mol percentage) and the balance Titanium, or a mixture of Ti—Ta base alloys molten with 4% Tin (Sn) or 4% Zircon (Zr) by mass percentage possess a shape recovery start temperature in excess of 150° C. (423K).

SUMMARY OF THE INVENTIONS

The conventional high temperature shape memory alloys No. 1 and 2 described above are brittle and easy to break, resulting in poor machinability and thus failure in cold working.

In the above described shape memory alloys Nos. 3-5 and 8, beside the poor machinability, add high price elements (Pd, Au, Pt) also making the alloys quite expensive.

In the above described shape memory alloy No. 6, apart from the poor machinability, Ni5Al3 precipitates weaken the structural stability of the alloy, and thus embrittle the alloy, Therefore, repeated use of the alloy over 200° C. is impossible. That is to say, the alloy does not exhibit shape memory effects.

In the above-mentioned shape memory alloy No. 7, even though it possesses good machinability, the alloy also exhibits poor structural stability and loss of shape memory property over 100° C. due to precipitation of the ω phase, which lowers the transformation temperature, and makes repeated operation impossible. That is to say, the alloy does not exhibit shape memory effects.

The above-mentioned shape memory alloy No. 9 fails for repeated operation due to its relative ease of plastic deformation. Furthermore, the alloy is subjected to loss of shape memory property because the ω phase is formed easily during operation.

The present embodiments address the problems of the prior art and provide high temperature shape memory alloys which have good machinability and are suitable for repeated high temperature operation.

Embodiment 1

Titanium-Tantalum base shape memory alloys of Embodiment 1 are provided to solve the afore-described technical problems, where the alloys consists of 30 mol %-40 mol % Tantalum and the balance Titanium and impurities.

For the high temperature shape memory alloys having the components in Embodiment 1, since the binary alloys consists of 30 mol %-40 mol % Tantalum and the balance Titanium, they can be used repeatedly for high temperature operation with high transformation temperature and shape memory effect. Besides, they can be cold worked.

Embodiment 2

Titanium-Tantalum base shape memory alloys of Embodiment 2 are provided to solve the afore-describe technical problems, where the alloys consist of 24 mol %-35 mol % Tantalum and 0.5 mol %-7 mol % α phase stabilizing elements, and the balance Titanium and impurities.

In the Titanium-Tantalum base shape memory alloys of Embodiment 2, since the alloy consists of 24 mol %-35 mol % Tantalum and 0.5 mol %-7 mol % α phase stabilizing elements (such as Al and Si), precipitation of ω phase causing the loss of shape memory property is restrained. Therefore these alloys can be used repeatedly for high temperature operation with high transformation temperature and shape memory effect. Besides, they can be cold worked.

Embodiment 3

Titanium-Tantalum base shape memory alloys of Embodiment 3 are provided to solve the afore-described technical problems, where the alloys consist of 25 mol %-35 mol % Tantalum, 0.1 mol %-1 mol % interstitial alloying elements, and the balance Titanium and impurities.

In the Titanium-Tantalum base shape memory alloys of Embodiment 3, since the alloys consist of 25 mol %-35 mol % Tantalum and 0.1 mol %-1 mol % interstitial alloying elements (such as N, B, O and C), they can be used repeatedly for high temperature operation with high transformation temperature and shape memory effect. Besides, precipitation of ω phase, which results in the loss of shape memory effect, is restrained with the help of the 0.1 mol %-1 mol % interstitial alloying elements, and plastic deformation is also restrained through solution hardening.

Embodiment 4

Titanium-Tantalum base shape memory alloys of Embodiment 4 are provided to solve the afore-described technical problems, where the alloys consist of 15 mol %-35 mol % Tantalum, 0.5 mol %-12 mol % β phase stabilizing elements being a congener of Ta, and the balance Titanium and impurities.

In the Titanium-Tantalum base shape memory alloys of Embodiment 4, since the alloys consist of 15 mol %-35 mol % Tantalum and 0.5 mol %-12 mol % β phase stabilizing elements being a congener of Ta (such as V and Nb etc.), the alloys can be used repeatedly for high temperature operation with high transformation temperature and shape memory effect. Besides, the alloys can be cold worked.

Embodiment 5

Titanium-Tantalum base shape memory alloys of Embodiment 5 are provided to solve the afore-described technical problems, where the alloy consist of 20 mol %-35 mol % Tantalum and 0.1 mol %-2 mol % transition metal elements; and the balance Titanium and impurities.

In the Titanium-Tantalum base shape memory alloys of Embodiment 5, since the alloys consist of 20 mol %-35 mol % Tantalum and 0.1 mol %-2 mol % transition metal elements (Mo, Fe, Mn, Co, Cr, Ni, β phase stabilizing element), precipitation of the ω phase that causes the loss of shape memory property is restrained. Thus, these alloys can be used repeatedly for high temperature operation with high transformation temperature and shape memory effect, and can also be cold worked.

Embodiment 6

Titanium-Tantalum base shape memory alloys of Embodiment 6 are provided to solve the afore-described technical problems, where the alloys consist of 25 mol %-35 mol % Tantalum, 0.5 mol %-10 mol % Zirconium or Hafnium, and the balance Titanium and impurities.

In the Titanium-Tantalum base shape memory alloys of Embodiment 6, since the alloys consist of 25 mol %-35 mol % Tantalum and 0.5 mol %-10 mol % Zirconium or Hafnium, the transformation strain increases and precipitation of ω phase, resulting in the loss of shape memory property, is restrained. In the meanwhile, the alloys can be used repeatedly for high temperature operation with high transformation temperature and shape memory effect, besides, the alloys can be cold worked.

Embodiment 7

Titanium-Tantalum base shape memory alloys of Embodiment 7 are provided to solve the afore-described technical problems, where the alloys consist of 25 mol %-35 mol % Tantalum, 0.5 mol %-5 mol % Tin, and the balance Titanium and impurities.

For the Titanium-Tantalum base shape memory alloys of Embodiment 7, since the alloy consists of 25 mol %-35 mol % Tantalum and 0.5 mol %-5 mol % Tin, the alloys can be used repeatedly for high temperature operation with high transformation temperature and shape memory effects. Besides, the alloys can be cold worked. Furthermore, by adding 0.5 mol %-5 mol % Tin, precipitation of the ω phase, which causes the loss of shape memory property, is restrained, while plastic deformation is also restrained.

Embodiment 8

Titanium-Tantalum base shape memory alloys of Embodiment 8 are provided to solve the afore-described technical problems, where the alloys consist of 15 mol %-35 mol % Tantalum, additive elements, and the balance Titanium and impurities, with Tantalum equivalent in the range of 30 mol % to 39.5 mol %.

For the Titanium-Tantalum base shape memory alloys of Embodiment 8, since the alloys consist of 15 mol %-35 mol % Tantalum and a certain amount of additive elements to achieve a Tantalum equivalent in the range of 30 mol % to 39.5 mol %, the alloys can be used repeatedly for high temperature operation with high transformation temperature and shape memory effects.

(Form 1 of Embodiment 8)

Titanium-Tantalum base shape memory alloys of Form 1 in Embodiment 8 comprise at least one element selected from the group consisting of α phase stabilizing elements, invasive elements, β phase stabilizing elements, or migrating metallic elements as the additive elements.

For the Titanium-Tantalum base shape memory alloys of Form 1 in Embodiment 8, the additive elements comprise at least one element selected from the group consisting of α phase stabilizing elements, interstitial alloying elements, β phase stabilizing elements, and transition metal elements.

(Form 2 of Embodiment 8)

The Titanium-Tantalum base shape memory alloys of Form 2 in Embodiment 8 comprise 0.5 mol %-5 mol % Zr and at least one element selected from the group consisting of α phase stabilizing elements, interstitial alloying elements, β phase stabilizing elements, Hafnium, and transition metal elements as the additive elements.

For the Titanium-Tantalum base shape memory alloys of Form 2 in Embodiment 8, the alloy comprises 0.5 mol %-5 mol % Zr and at least one element selected from the group consisting of α phase stabilizing elements, interstitial alloying elements, β phase stabilizing elements, Hafnium and transition metal elements as the additive elements.

(Form 3 of Embodiment 8)

The Titanium-Tantalum base shape memory alloys of Form 3 in Embodiment 8 comprise 0.5 mol %-2 mol % Sn and at least one element selected from the group consisting of α phase stabilizing elements, interstitial alloying elements, β phase stabilizing elements, Hafnium, and transition metal elements as the additive.

In the Titanium-Tantalum base shape memory alloys of Form 3 in Embodiment 8, the alloys are multiple component alloys that comprise 0.5 mol %-2 mol % Sn and at least one element selected from the group consisting of α phase stabilizing elements, interstitial alloying elements, β phase stabilizing elements, Hafnium, and transition metal elements as the additive.

(Form 4 of Embodiment 8)

The Titanium-Tantalum base shape memory alloys of Form 4 in Embodiment 8 comprise at least one element selected from the group consisting of Zr, Hf, Sn, α phase stabilizing elements, interstitial alloying elements, β phase stabilizing elements, and transition metal elements as the additive.

For the Titanium-Tantalum base shape memory alloys of Form 4 in Embodiment 8, the alloys are a multiple component alloy that comprise at least one element selected from the group consisting of Zr, Hf, Sn, α phase stabilizing elements, interstitial alloying elements, β phase stabilizing elements, and transition metal elements as the additive.

Embodiment 9

An actuator is provided in Embodiment 9 to solve the above-mentioned technical problems, where the actuator is made of the Titanium-Tantalum base shape memory alloy described in Embodiments 1 to 8 or forms 1 to 4 of Embodiment 8.

For the actuator in Embodiment 9, since the said actuator is made of the Titanium-Tantalum base shape memory alloy described in Embodiments 1 to 8 or forms 1 to 4 of Embodiment 8, it is capable to perform cold working, and in addition, repeated high temperature operation is possible with the help of its high transformation temperature and shape memory effect.

Embodiment 10

An engine is provided in Embodiment 10 to solve the above-mentioned technical problems, where the engine possesses a flux adjustment valve made of the Titanium-Tantalum base shape memory alloy described in Embodiments 1 to 8 or forms 1 to 4 of Embodiment 8.

For the engine in Embodiment 10, since the engine possesses a flux adjustment valve made of the Titanium-Tantalum base shape memory alloys described in Embodiments 1 to 8 or forms 1 to 4 of Embodiment 8, repeated high temperature operation is possible with the help of high transformation temperature and shape memory effect.

The present embodiments, as mentioned above, provide shape memory alloys capable of repeated operation with high machinability.

BRIEF DESCRIPTION OF THE DRAWINGS

FIG. 1 is a graph showing the experimental data of shape memory property evaluation test.

FIG. 2 indicates the experimental results of Ti—Ta binary alloy in embodiment.

DETAILED DESCRIPTION

Embodiments of the present disclosure are described in detail below.

As embodiments of the present disclosure, 52 alloy specimens, Nos. 1 to 52, as shown in Tables 1 to 7 were prepared and corresponding experiments were carried out. As well, comparative examples of alloy specimens, Nos. 53 to 57, as shown in Tables 8 were prepared, and corresponding experiments were carried out. Specimens were prepared by the below described process including steps (1) to (3).

In step 1, each metallic element is measured by mol %, and then molten by means of arc melting method to make alloy ingots. Namely, alloy No. 1 (Ti-36Ta) has a composition expressed as 36 mol % Ta, and the balance Ti (64 mol %), alloy No. 5 (Ti-30Ta-1Al) has a composition expressed as 30 mol % Ta, 1 mol % Al and the balance Ti (69 mol %).

In step 2, the resultant alloy ingots are subjected to cold rolling at a rolling ratio in the range of 80% to 95% to make billets.

In step 3, test pieces of 40 mm long, 1.5 mm wide and 0.1 mm thick are cut off billets.

FIG. 1 is a graph showing the experimental data of shape memory property evaluation test.

Figure 1A:
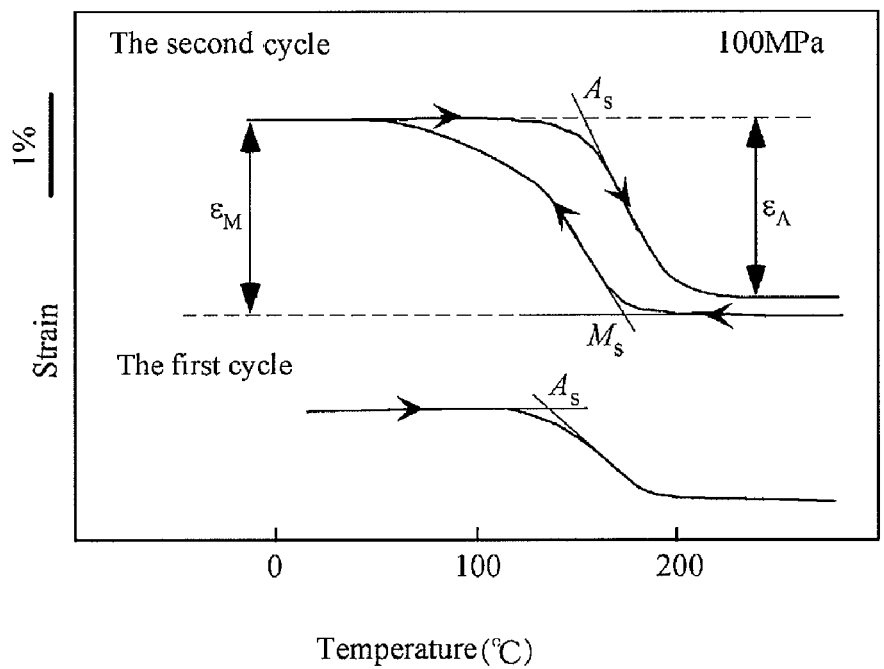
FIG. 1A shows the typical strain versus temperature curve of alloys representing repeated shape memory effect.

FIG. 1A shows the typical strain versus temperature curve of alloys representing repeated shape memory effect.

Figure 1B:
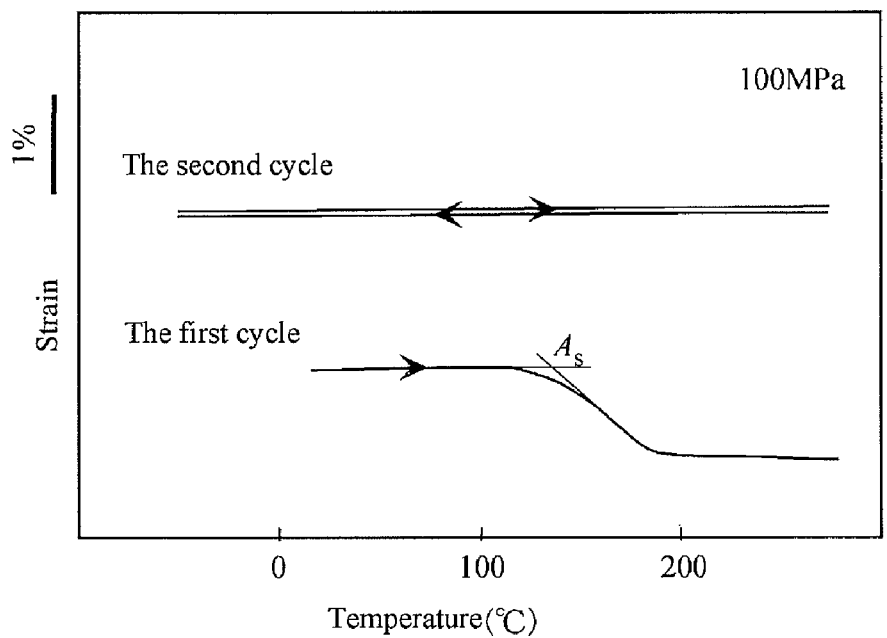
FIG. 1B shows the typical strain versus temperature curve of alloys representing unrepeated shape memory effect.

FIG. 1B shows the typical strain versus temperature curve of alloys representing unrepeated shape memory effect.

(Shape Memory Effect Evaluation Test)

Experiments were carried out to evaluate shape memory effect of the alloys prepared by the above mentioned method. As shown in the following Tables 1 and 8, the transformation temperatures ($A_s$, $M_s$) and shape recovery ratio (%) indicating shape memory effect were evaluated through thermal cycle testing (−100° C.-300° C.) under stress (100 MPa) using a tension testing machine. It can be seen that about the same temperature versus strain curves for alloys Nos. 1 to 16 and 57 indicating shape memory effect are plotted in FIG. 1A, from which, $A_s$ (reverse transformation start temperature), $M_s$ (martensite start temperature), transformation strain $\epsilon_M$, recovery strain $\epsilon_A$ and recovery ratio ($\epsilon_A/\epsilon_M$) were obtained. In addition, about the same temperature versus strain curves were shown in FIG. 1B for alloys Nos. 53 to 56 which exhibit no shape memory effect after the second cycle, from which, $A_s$ (reverse transformation start temperature) at first cycle was measured.

Furthermore, as shown in Tables 2 to 7, after 2% strain was applied at room temperature using a tension testing machine and then two thermal cycles were performed (room temperature ~250° C.), shape recovery ratio at each cycle representing shape memory effect were evaluated. Moreover, as listed in the following Tables 1 to 8, Ta equivalent is calculated through the following equation (Equation 1).

Ta equivalent(mol. %)=Ta (mol. %) +1.2Al (mol. %)+5.6Si(mol. %)+8.3(N(mol. %)+B (mol. %)+C(mol. %)+O(mol. %)+Mo(mol. %))+ 3.9V(mol. %)+1.7Nb(mol. %)+6.4(Fe (mol. %)+Mn(mol. %))+5(Co(mol. %)+Cr (mol. %))+4.2Ni(mol. %)+1.1Zr(mol. %)+1.1Hf (mol. %)+2.8Sn(mol. %)

Through the Ta equivalent calculation of Equation (1), the combined effect of Ta content and other elements except Ta on transformation temperature is converted to that of Ta content only. The Equation (1) was derived from experimental results of the inventors, by calculating the Ta equivalent, the variation of transformation temperature can be obtained (surmised).

The composition of Ti—Ta binary alloys Nos. 1 to 3 and alloys Nos. 4 to 16 with additive elements to Ti—Ta base in embodiments, along with the measured results of $A_s$ (° C.) at the first cycle for each alloy, $M_s$(° C.) at the second cycle, transformation strain $\epsilon_M$ (%), recovery strain $\epsilon_M$ (%), shape recovery ratio $(\epsilon_A/\epsilon_M)$ (%) and Ta equivalent (mol %) are listed in Table 1.

TABLE 1

Transformation temperature and recovery ratio of alloy embodiments

| No. | composition | $A_s$ (° C.) at the first cycle | $M_s$(° C.) at the second cycle | transformation strain $\epsilon_M$(%) | recovery strain $\epsilon_M$(%) | shape recovery ratio (%) | Ta equivalent (mol %) |
|---|---|---|---|---|---|---|---|
| 1 | Ti—36Ta | 105 | 102 | 1.7 | 1.5 | 88 | 36 |
| 2 | Ti—32Ta | 188 | 180 | 1.7 | 1.6 | 94 | 32 |
| 3 | Ti—30Ta | 198 | 195 | 1.2 | 1.2 | 100 | 30 |
| 4 | Ti—35Ta—0.5Al | 104 | 105 | 1.8 | 1.7 | 94 | 35.6 |
| 5 | Ti—30Ta—1Al | 146 | 138 | 2.1 | 2.0 | 95 | 31.2 |
| 6 | Ti—27Ta—5Al | 156 | 152 | 2.0 | 2.0 | 100 | 33.0 |
| 7 | Ti—30Ta—5Al | 98 | 95 | 1.6 | 1.4 | 88 | 36.0 |
| 8 | Ti—25Ta—7Al | 131 | 132 | 1.7 | 1.6 | 94 | 33.4 |
| 9 | Ti—30Ta—0.5N | 90 | 112 | 2.0 | 1.8 | 90 | 34.2 |
| 10 | Ti—25Ta—1N | 157 | 149 | 0.8 | 0.6 | 75 | 33.3 |
| 11 | Ti—35Ta—0.5Nb | 103 | 101 | 1.7 | 1.6 | 94 | 35.9 |
| 12 | Ti—25Ta—5Nb | 151 | 145 | 0.8 | 0.7 | 88 | 33.5 |
| 13 | Ti—20Ta—10Nb | 125 | 101 | 2.0 | 1.8 | 90 | 37.0 |
| 14 | Ti—30Ta—1V | 128 | 122 | 2.1 | 2.1 | 100 | 33.9 |
| 15 | Ti—25Ta—1Mo | 135 | 128 | 0.7 | 0.6 | 86 | 33.3 |
| 16 | Ti—30Ta—1Zr | 185 | 181 | 2.3 | 2.2 | 96 | 31.1 |

The composition of Ti—Ta base ternary alloys Nos. 4 to 8, 17 and 18, along with the measured results of shape recovery ratio (%) at the first and second cycle, and Ta equivalent (mol %) for each alloy, are listed in Table 2. Al (Aluminum) or Si (Silicon) is added in the alloys as α phase stabilizing elements (indicated as A group in the description of the application) that have effect to increase the transformation temperature at which Ti alloys transform from low temperature stable α phase to high temperature stable β phase, restrain the precipitation of ω phase that causes the loss of shape memory property, and improve thermal stability and shape recovery as well.

TABLE 2

Shape memory effect of the invented alloys (A group)

| No. | composition | shape recovery ratio (%) at first cycle | shape recovery ratio (%) at second cycle | Ta equivalent (mol %) |
|---|---|---|---|---|
| 4 | Ti—35Ta—0.5Al | 95 | 95 | 35.6 |
| 5 | Ti—30Ta—1Al | 98 | 95 | 31.2 |
| 6 | Ti—27Ta—5Al | 100 | 100 | 33.0 |
| 7 | Ti—30Ta—5Al | 90 | 85 | 36.0 |
| 8 | Ti—25Ta—7Al | 95 | 93 | 33.4 |
| 17 | Ti—24Ta—5Al | 95 | 95 | 30.0 |
| 18 | Ti—30Ta—1Si | 84 | 80 | 35.6 |

In addition, the composition of Ti—Ta base ternary alloys Nos. 9, 10, 19 to 22, along with the measured results of shape recovery ratio (%) and Ta equivalent (mol %) at the first and second cycle for each alloy, is listed in Table 3. N B, O, or C is added in each alloy as interstitial alloying elements (indicated as B group in the description of the application) that have effect to restrain the precipitation of ω phase, improve thermal stability and shape recovery, as well restrain plastic deformation through solution hardening,

TABLE 3

Shape memory effect of the invented alloys (B group)

| No. | composition | shape recovery ratio (%) at first cycle | shape recovery ratio (%) at second cycle | Ta equivalent (mol %) |
|---|---|---|---|---|
| 9 | Ti—30Ta—0.5N | 95 | 90 | 34.2 |
| 10 | Ti—25Ta—1N | 82 | 70 | 33.3 |
| 19 | Ti—35Ta—0.1N | 90 | 90 | 35.8 |
| 20 | Ti—25Ta—1B | 65 | 55 | 33.3 |

TABLE 3-continued

Shape memory effect of the invented alloys (B group)

| No. | composition | shape recovery ratio (%) at first cycle | shape recovery ratio (%) at second cycle | Ta equivalent (mol %) |
|---|---|---|---|---|
| 21 | Ti—25Ta—1O | 60 | 55 | 33.3 |
| 22 | Ti—25Ta—1C | 78 | 72 | 33.3 |

Furthermore, the composition of Ti—Ta base ternary alloys Nos. 11 to 14 and 23 to 26, together with the measured results of shape recovery ratio (%) at the first and second cycle for each alloy and Ta equivalent (mol %), is listed in Table 4. Nb or V being the congener of Ta element is added as β phase stabilizing elements (indicated as C group in the description of the application) to stabilize β mother phase.

TABLE 4

Shape memory effect of the invented alloys (C group)

| No. | composition | shape recovery ratio (%) at first cycle | shape recovery ratio (%) at second cycle | Ta equivalent (mol %) |
|---|---|---|---|---|
| 11 | Ti—35Ta—0.5Nb | 95 | 83 | 35.9 |
| 12 | Ti—25Ta—5Nb | 90 | 85 | 33.5 |
| 13 | Ti—20Ta—10Nb | 88 | 80 | 37.0 |
| 23 | Ti—15Ta—12Nb | 80 | 75 | 35.4 |
| 24 | Ti—30Ta—1Nb | 95 | 90 | 31.7 |
| 14 | Ti—30Ta—1V | 95 | 92 | 33.9 |
| 25 | Ti—25Ta—3V | 92 | 88 | 36.7 |
| 26 | Ti—20Ta—5V | 90 | 83 | 39.5 |

The composition of Ti—Ta base ternary alloys Nos. 15, 27 to 33, along with the measured results of shape recovery ratio (%) at the first and second cycle for each alloy, and Ta equivalent (mol %), is listed in Table 5. Mo, Cr, Fe, Mn, Co or Ni being the transition metal element is added as β phase stabilizing elements (indicated as D group in the description of the application) to stabilize β phase of Ti alloys.

TABLE 5

Shape memory effect of the invented alloys (D group)

| No. | composition | shape recovery ratio (%) at first cycle | shape recovery ratio (%) at second cycle | Ta equivalent (mol %) |
|---|---|---|---|---|
| 15 | Ti—25Ta—1Mo | 85 | 80 | 33.3 |
| 27 | Ti—20Ta—2Mo | 80 | 75 | 36.6 |
| 28 | Ti—35Ta—0.1Mo | 87 | 85 | 35.8 |
| 29 | Ti—25Ta—2Fe | 70 | 65 | 37.8 |
| 30 | Ti—25Ta—2Mn | 74 | 65 | 37.8 |
| 31 | Ti—25Ta—2Co | 75 | 60 | 35.0 |
| 32 | Ti—25Ta—2Cr | 75 | 66 | 35.0 |
| 33 | Ti—25Ta—2Ni | 80 | 65 | 33.4 |

The composition of Ti—Ta base ternary alloys Nos. 16, 34 to 40, along with the measured results of shape recovery ratio (%) at the first and second cycle for each alloy, and Ta equivalent (mol %) is listed in Table 6. Zr (Zirconium), Hf (Hafnium) or Sn (Tin) is added as additive elements (indicated as D group in the description of the application). Besides, Zr and Hf have an effect to increase transformation strain ($\epsilon_M$) remarkably (refer to Table 1), and Sn will be effective to restrain the precipitation of ω phase through solution hardening.

TABLE 6

Shape memory effect of the invented alloys (Zr, Hf, and Sn)

| No. | composition | shape recovery ratio (%) at first cycle | shape recovery ratio (%) at second cycle | Ta equivalent (mol %) |
|---|---|---|---|---|
| 16 | Ti—30Ta—1Zr | 95 | 92 | 31.1 |
| 34 | Ti—35Ta—0.5Zr | 95 | 94 | 35.6 |
| 35 | Ti—30Ta—5Zr | 90 | 82 | 35.5 |
| 36 | Ti—25Ta—10Zr | 89 | 80 | 36.0 |
| 37 | Ti—30Ta—5Hf | 75 | 70 | 35.5 |
| 38 | Ti—30Ta—1Sn | 80 | 75 | 32.8 |
| 39 | Ti—25Ta—5Sn | 77 | 70 | 39.0 |
| 40 | Ti—35Ta—0.5Sn | 85 | 80 | 36.4 |

The composition of Ti—Ta base multiple component alloys Nos. 41 to 52, in which the α phase stabilizing element, interstitial alloying element, β phase stabilizing element, Zr, Hf or Sn is added, along with the measured results of shape recovery ratio (%) at the first and second cycle for each alloy and Ta equivalent (mol %), is listed in Table 7.

TABLE 7

Shape memory effect of the invented alloys (multiple components)

| No. | composition | shape recovery ratio (%) at first cycle | shape recovery ratio (%) at second cycle | Ta equivalent (mol %) |
|---|---|---|---|---|
| 41 | Ti—25Ta—3Nb—1Al | 92 | 90 | 31.3 |
| 42 | Ti—20Ta—5Nb—5Al | 90 | 85 | 34.5 |
| 43 | Ti—15Ta—8Nb—5Al | 85 | 82 | 34.6 |
| 44 | Ti—25Ta—3Nb—0.5N | 73 | 70 | 34.3 |
| 45 | Ti—25Ta—3Nb—0.5Mo | 76 | 72 | 34.3 |
| 46 | Ti—25Ta—5Zr—1Al | 83 | 80 | 31.7 |
| 47 | Ti—25Ta—5Nb—3Al—2Zr | 85 | 80 | 34.3 |
| 48 | Ti—20Ta—3Nb—2Al—1Zr—0.5N | 83 | 80 | 32.8 |
| 49 | Ti—20Ta—3Al—0.5Zr—1Mo | 82 | 75 | 32.5 |
| 50 | Ti—27Ta—5Al—0.5Sn | 95 | 95 | 34.4 |
| 51 | Ti—25Ta—3Nb—2Sn | 85 | 85 | 35.7 |
| 52 | Ti—25Ta—2Zr—1Sn—2Al—1Hf | 80 | 75 | 33.5 |

As comparative examples, the composition of alloys Nos. 53 to 57, along with the measured results of shape recovery ratio (%) at the first and second cycle for each alloy and Ta equivalent (mol %), are listed in Table 8. Alloy No. 53 is a Ti-22Nb binary alloy according to conventional technology (7), alloy No. 54 is a Ti-27Ta binary alloy with 27 mol % (=58 wt %) Ta given as an example of Ta content below 30 mol % as described in Ikeda, et al. Alloys Nos. 55 and 56 are the alloys described in Ikeda, et al. according to conventional technology (9) with Ta equivalent less than 30 mol %, alloy No. 57 is a Ti-40Ta base binary alloy.

In addition, as shown in Table 8, in the case when transformation temperature $M_s$ at the second cycle is not identified, with transformation strain $\epsilon_M$ and recovery strain $\epsilon_A$ also not observed, namely, in the case while the shape memory property loses at the first cycle, it is marked x in Table 8.

TABLE 8

Transformation temperature and recovery ratio of the comparative examples

| No. | composition | $A_s$ (° C.) at the first cycle | $M_S$(° C.) at the second cycle | transformation strain $\epsilon_M$ (%) | recovery strain $\epsilon_A$ (%) | shape recovery ratio (%) | Ta equivalent (mol %) |
|---|---|---|---|---|---|---|---|
| 53 | Ti—22Nb | 180 | x | x | x | x | 37.4 |
| 54 | Ti—27Ta | 265 | x | x | x | x | 27.0 |
| 55 | Ti—21.7Ta—2.8Sn | 245 | x | x | x | x | 29.4 |
| 56 | Ti—19Ta—8Zr | 220 | x | x | x | x | 27.8 |
| 57 | Ti—40Ta | 23 | 28 | 2.1 | 1.7 | 81 | 40.0 |

The following conclusion can be drawn from the forgoing description of the experiment results. For Ti—Ta base binary alloys (Nos. 1 to 3) with 30 mol %-36 mol % Ta, transformation temperature of over 100° C. was observed and high shape recovery ratio was confirmed. Accordingly, the alloys can be used for repeated operation at high temperature (over 50° C. (323K)) as shape memory alloys.

Besides, even with Ta content below 30 mol %, high transformation temperature and shape recovery ratio was identified for alloys Nos. 4 to 8, 17 and 18 with Ta equivalent above 30 mol % by adding α phase stabilizing elements (Al, Si) of A group (refer to Tables 1 and 2). Moreover, if the total content of α phase stabilizing elements exceeds 7 mol %, cold rolling of over 80 mol % deformation is difficult, therefore total content below 7 mol % is preferable.

Furthermore, as shown in Tables 1 and 3, even with Ta content below 30 mol %, high transformation temperature and shape recovery ratio are confirmed for alloys Nos. 9, 10, and 19 to 22, with Ta equivalent above 30 mol % by adding B group interstitial alloying elements (N, B, O, C). Moreover, with increasing addition of interstitial alloying elements, recovery ratio decreases, and cold workability to make test pieces reduces, when the total content of interstitial alloying elements exceeds 1 mol %, cold rolling of over 80 mol % deformation for making test pieces is difficult.

Additionally, as shown in Tables 1 and 4, even with Ta content below 30 mol %, high transformation temperature and shape recovery ratio were identified for alloys Nos. 11 to 14 and 23 to 26 with Ta equivalent above 30 mol % by adding C group elements (Nb, V). Moreover, for alloys Nos. 11 to 14 and 23 to 26, it can be seen that with increasing addition of C group elements, recovery ratio decreases, meanwhile transformation temperature reduces with increasing Ta equivalent, accordingly, total content of below 12 mol % is preferable in order to obtain recovery ratio exceeding 75%.

Furthermore, as shown in Tables 1 and 5, even with Ta content below 30 mol %, high transformation temperature and shape recovery ratio were identified for alloys Nos. 15, 27 to 33 with Ta equivalent above 30 mol % by adding D group elements (Mo, Fe, Mn, Co, Cr, Ni). Moreover, for alloys Nos. 15 and 27, it can be seen that with increasing addition of D group elements, recovery ratio decreases, thus cold machinability reduces, in the meanwhile, transformation temperature reduces. If the total content of D group element exceeds 2 mol %, cold rolling of over 80 mol % deformation for making test pieces is difficult. Accordingly, total content of D group elements below 2 mol % is preferable.

Additionally, as shown in Tables 6 and 8, even with Ta content below 30 mol %, high transformation temperature and shape recovery ratio were identified for alloys Nos. 16 and 34 to 40 with Ta equivalent above 30 mol % by adding Zr, Hf, Sn. Moreover, for alloys Nos. 16, 34 to 36 and 38 to 40, it can be seen that with increasing addition of Zr and Sn, recovery ratio tends to decrease resulting in the loss of shape memory effect, thus cold machinability reduces. Accordingly, transformation temperature reduces if Ta equivalent is too high, total Zr content below 10 mol % and Sn content below 5 mol % as well is preferable.

Additionally, as shown in Table 7, high shape recovery ratio was identified for alloys Nos. 41 to 52 with Ta equivalent above 30 mol % by adding A group, B group, C group, D group, Zr, Hf and Sn additive elements.

Figure 2A:
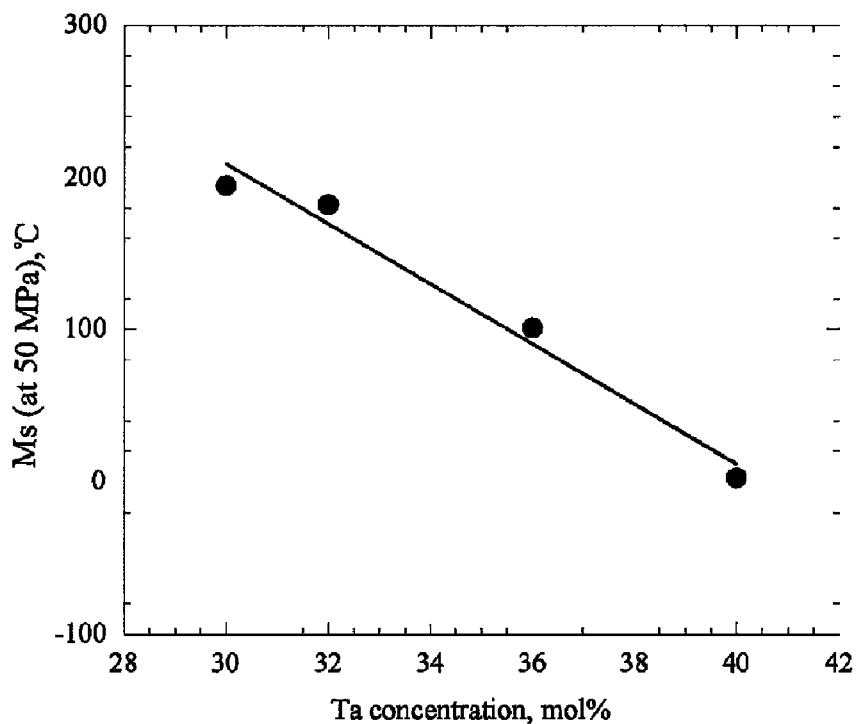
FIG. 2A shows the relationship between Ta mol ratio and Martensite start temperature ($M_s$) under 50 MPa.
Figure 2B:
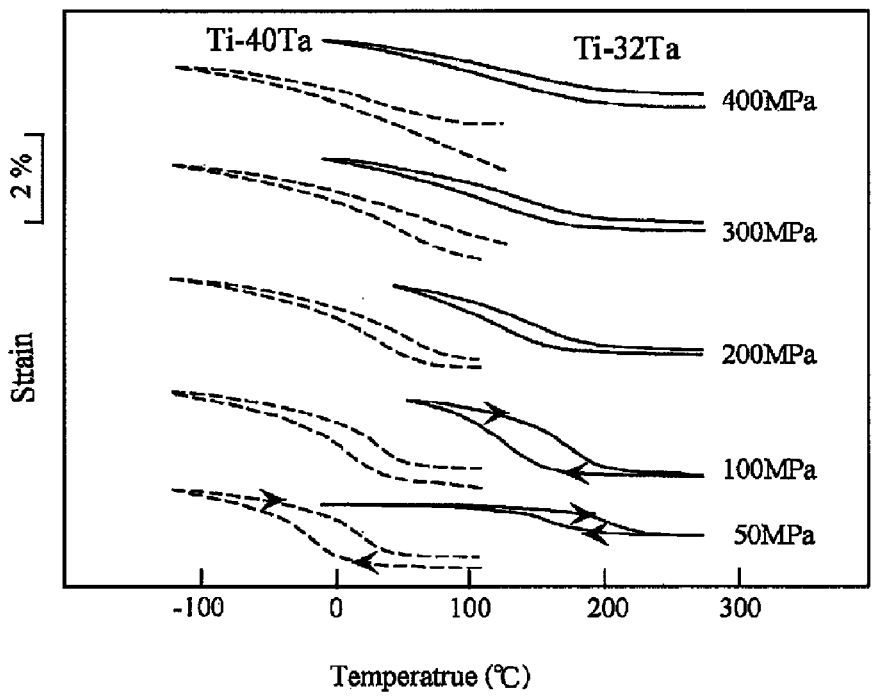
FIG. 2B shows the temperature versus strain curves of Ti-32Ta and Ti-40Ta.

FIG. 2 indicates the experimental results of Ti—Ta binary alloys in embodiment. FIG. 2A shows the relationship between Ta mol ratio and Martensite start temperature ($M_s$) under 50 MPa, and FIG. 2B shows the temperature versus strain curves of Ti-32Ta and Ti-40Ta.

Figure 3:
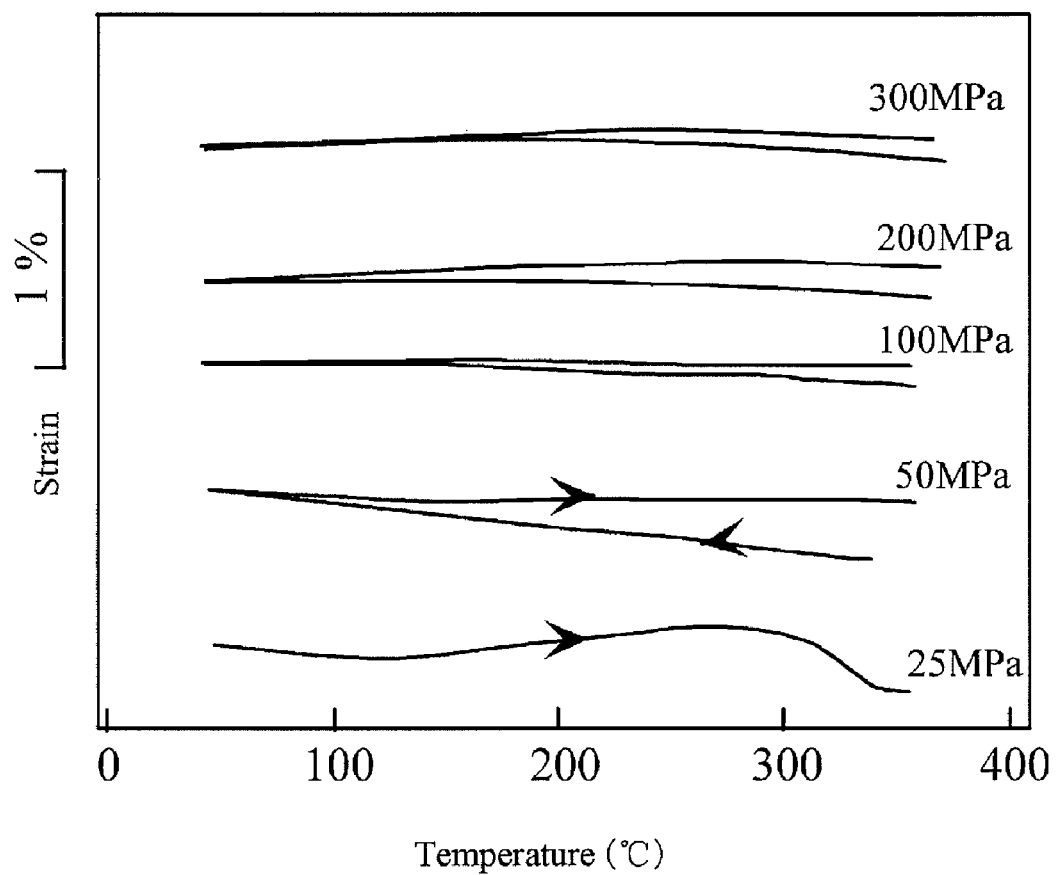
FIG. 3 shows the temperature versus strain curves of Ti-27Ta binary alloys in embodiment.

FIG. 3 shows the temperature versus strain curves of Ti-27Ta binary alloys in embodiment.

As shown in Tables 1, 8 and FIG. 2, from the experimental results of alloys 1 to 3 and 57, as well as FIG. 2, for Ti—Ta base binary alloys, transformation temperature reduces to below 50° C. with Ta content above 40 mol %, shape memory effect fails under thermal cycle at high temperature. In addition, it can be seen from FIG. 2B that the shape recovery ratio decreases.

Furthermore, as shown from the experimental results of alloys Nos. 1 to 3, 54 and FIG. 3, for Ti—Ta base binary alloys, high transformation temperatures are obtained when Ta content is lower than 30 mol %, and shape memory effect is identified only at the first cycle, but not identified after the second cycle (as marked x in Table 8), indicating that precipitation of ω phase causes failure of shape memory effect. Additionally, when Ta content is lower than 30 mol %, plastic deformation is easy to occur resulting in failure for repeated operation.

Figure 4:
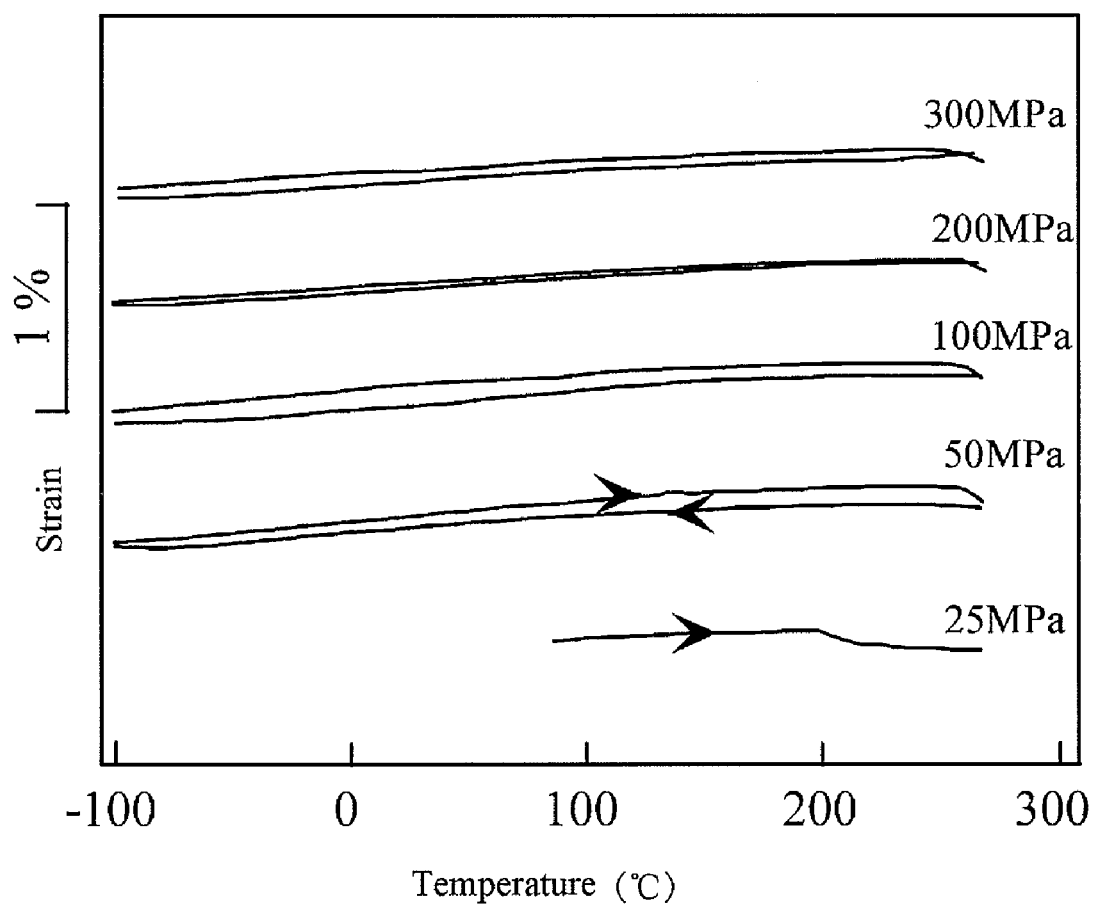
FIG. 4 shows the temperature versus strain curves of Ti-22Nb binary alloys in comparative example

FIG. 4 shows the temperature versus strain curves of Ti-22Nb binary alloys in comparative example. From the experimental results of alloys No. 53 in Table 8 and FIG. 4, it could be confirmed that even though Ti-22Nb alloy had approximately the same transformation temperature as Ti-32Ta alloys, mere thermal expansion or shrinkage would cause a thermally unstable state since shape memory property lost after the second cycle as shown in FIG. 4.

In the above description, embodiments of the present invention were set forth, it will be understood that the invention is not limited to the specific forms shown, modification may be made without departing from the scope of the present invention as expressed in the claims.

INDUSTRIAL APPLICATION

Since embodiments of the afore-described shape memory alloy do not lose their shape memory property during repeated operation at high temperature, they can be used as a valve inside gas channel of an engine (engine of automobile, aircrafts, or gas turbine) for high temperature operation, when heated, channel area is regulated with the help of the shape memory effect; when cooled, channel area is reversed back by a spring used for deforming the valve. In addition, they can also be used as lubricant supplying valve of high speed rotating shaft. Furthermore, they can be used as safety device for power supply of household electric appliance at high temperature operation. In addition, it can also be used as an actuator for high temperature operation. When they are used as an actuator, the high transformation temperature leads to a significant difference between the ambient temperature (such as room temperature) and operating temperature, therefore improving cooling efficiency and increasing the cooling speed as well. As a result, with increasing cooling speed, responsiveness improves resulting in increasing operating frequency.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A Titanium-Tantalum base shape memory alloys, wherein said alloy consists of 30 mol %-40 mol % Tantalum and the balance Titanium and impurities.

2. A Titanium-Tantalum base shape memory alloy, wherein said alloy consists of 24 mol %-35 mol % Tantalum, one or more of Aluminum and Silicon, wherein the total percentage of Aluminum and Silicon is 0.5 mol %-7 mol %, and the balance Titanium; and impurities.

3. A Titanium-Tantalum base shape memory alloy, wherein said alloy consists of 25 mol %-35 mol % Tantalum, one or more of N, O, B, and C, wherein the total percentage of N, O, B, and C is 0.1 mol %-1 mol %; and the balance Titanium and impurities.

4. A Titanium-Tantalum base shape memory alloy, wherein said alloy consists of 15 mol %-35 mol % Tantalum, one or more of V and Nb, wherein the total percentage of V and Nb is 0.5 mol %-12 mol %, and the balance Titanium, and impurities.

5. A Titanium-Tantalum base shape memory alloy, wherein said alloy consists of 20 mol %-35 mol % Tantalum, 0.1 mol %-2 mol % transition metal elements, and the balance Titanium and impurities.

6. A Titanium-Tantalum base shape memory alloy, wherein said alloy consists of 25 mol %-35 mol % Tantalum, 0.5 mol %-10 mol % Zirconium or Hafnium, and the balance Titanium, and impurities.

7. A Titanium-Tantalum base shape memory alloy, wherein said alloy consists of 25 mol %-35 mol % Tantalum, 0.5 mol %-5 mol % Tin, and the balance Titanium and impurities.

8. A shape memory alloy, consisting essentially of:
15-35 mol % Tantalum (Ta);
Titanium (Ti); and
one or more of Aluminum (Al), Silicon (Si), Nitrogen (N), Boron (B), Oxygen (O), Carbon (C), Vanadium (V), Niobium (Nb), Molybdenum (Mo), Iron (Fe), Mn (Manganese), Cobalt (Co), Chromium (Cr), Nickel (Ni), Zirconium (Zr), Hafnium (Hf), and Tin (Sn);
wherein the total percentage of Ta, Nb, and V is 23 mol %-35.5 mol %; and
wherein the elements are provided in an amount such that the alloy exhibits a Tantalum equivalent between 30 to 39.5 mol. %, the Tantalum equivalent calculated according to the equation:

$$Ta\ equivalent(mol.\ \%) = Ta\ (mol.\ \%) + 1.2Al\ (mol\ \%) + 5.6Si(mol.\ \%) + 8.3(N(mol\ \%) + B\ (mol\ \%) + C(mol\ \%) + O(mol.\ \%) + Mo(mol\ \%)) + 3.9V(mol\ \%) + 1.7Nb(mol\ \%) + 6.4(Fe\ (mol\ \%) + Mn(mol.\ \%)) + 5.0\ (Co(mol\ \%) + Cr\ (mol\ \%)) + 4.2Ni(mol\ \%) + 1.1Zr(mol\ \%) + 1.1Hf\ (mol\ \%) + 2.8Sn(mol\ \%).$$

9. An actuator, wherein the said actuator is made of a Titanium-Tantalum base shape memory alloy described in claim 8.

10. An engine equipped with a flux adjusting valve, wherein the said flux adjusting valve is made of a Titanium-Tantalum base shape memory alloy described in claim 8.

11. The alloy of claim 8, consisting essentially of:
24 mol %-35 mol % Tantalum;
at least one of Al and Si, wherein the total percentage of Al and Si is 0.5 mol %-7 mol %; and
Titanium.

12. The alloy of claim 8, consisting essentially of:
25 mol %-35 mol % Tantalum;
one or more of N, B, O, and C, wherein the total percentage of N, B, O, and C is 0.1 mol %-1 mol % of;
Titanium.

13. The alloy of claim 8, consisting essentially of:
15 mol %-35 mol % Tantalum;
one or more of V and Nb, wherein the total percentage of V and Nb is 0.5 mol %-12 Mol %; and
Titanium.

14. The alloy of claim 8, consisting essentially of:
20 mol %-35 mol % Tantalum;
one or more of Mo, Fe, Mn, Co, Cr, Ni, V, and Nb, wherein the total percentage of Mo, Fe, Mn, Co, Cr, Ni, V, and Nb is 0.1 mol %-2 mol % of transition metal-elements; and
Titanium.

15. The alloy of claim 8, consisting essentially of:
25 mol %-35 mol % Tantalum;
0.5 mol %-10 mol % Zirconium or Hafnium; and
Titanium.

16. The alloy of claim 8, consisting essentially of:
25 mol %-35 mol % Tantalum;
0.5 mol %-5 mol % Tin; and
Titanium.

* * * * *